(12) United States Patent
Strand et al.

(10) Patent No.: US 10,820,212 B2
(45) Date of Patent: Oct. 27, 2020

(54) SYSTEM AND METHOD FOR PARTITIONED WIRELESS TELECOMMUNICATION NETWORK DEPLOYMENT

(71) Applicant: EXPETO WIRELESS INC., Vancouver (CA)

(72) Inventors: Terje Strand, San Francisco, CA (US); Brian Lee Baird, North Saanich (CA); Ryley Kenneth John Mackenzie, Victoria (CA)

(73) Assignee: Expeto Wireless Inc., Vancouver, B.C. (CA)

( * ) Notice: Subject to any disclaimer, the term of this patent is extended or adjusted under 35 U.S.C. 154(b) by 171 days.

(21) Appl. No.: 15/289,957

(22) Filed: Oct. 10, 2016

(65) Prior Publication Data
US 2017/0105144 A1 Apr. 13, 2017

Related U.S. Application Data
(60) Provisional application No. 62/239,904, filed on Oct. 10, 2015.

(51) Int. Cl.
*H04W 16/18* (2009.01)

(52) U.S. Cl.
CPC .................................. *H04W 16/18* (2013.01)

(58) Field of Classification Search
None
See application file for complete search history.

(56) References Cited

U.S. PATENT DOCUMENTS

| | | | | |
|---|---|---|---|---|
| 9,519,394 B2* | 12/2016 | Smith | ...................... | G06F 3/048 |
| 2006/0067341 A1* | 3/2006 | Barber | ................ | H04L 12/2803 |
| | | | | 370/401 |
| 2009/0113018 A1* | 4/2009 | Thomson | ................ | H04W 8/12 |
| | | | | 709/208 |
| 2012/0170502 A1* | 7/2012 | Korus | ..................... | H04W 4/06 |
| | | | | 370/312 |
| 2014/0310388 A1* | 10/2014 | Djukic | ................ | H04L 41/0816 |
| | | | | 709/221 |
| 2018/0062847 A1* | 3/2018 | Mildh | ................... | H04W 12/10 |

* cited by examiner

*Primary Examiner* — Noel R Beharry
*Assistant Examiner* — Richard Schnell
(74) *Attorney, Agent, or Firm* — Klarquist Sparkman, LLP

(57) ABSTRACT

A system and method for intelligently partitioning a virtualized wireless telecommunication network that algorithmically identifies a desirably efficient partitioning scheme such as to desirably enhance at least one of performance, latency, processing efficiency, error detection and management, error propagation and confinement of errors and cost effectiveness of the wireless network is disclosed. A system and method provides for intelligently partitioning a virtualized wireless telecommunication network that desirably provides for deployment of virtualized network functions using micro containers using software defined networking (SDN), and to desirably reduce propagation and impact of failure or errors in one partition of the wireless network. A method provides for partitioning a virtualized wireless telecommunication network comprising deployment of virtualized network functions on micro containers using SDN to dynamically provide an entire wireless telecommunication core network system, such as a Long Term Evolution (LTE) Evolved Packet Core (EPC) network system.

20 Claims, 1 Drawing Sheet

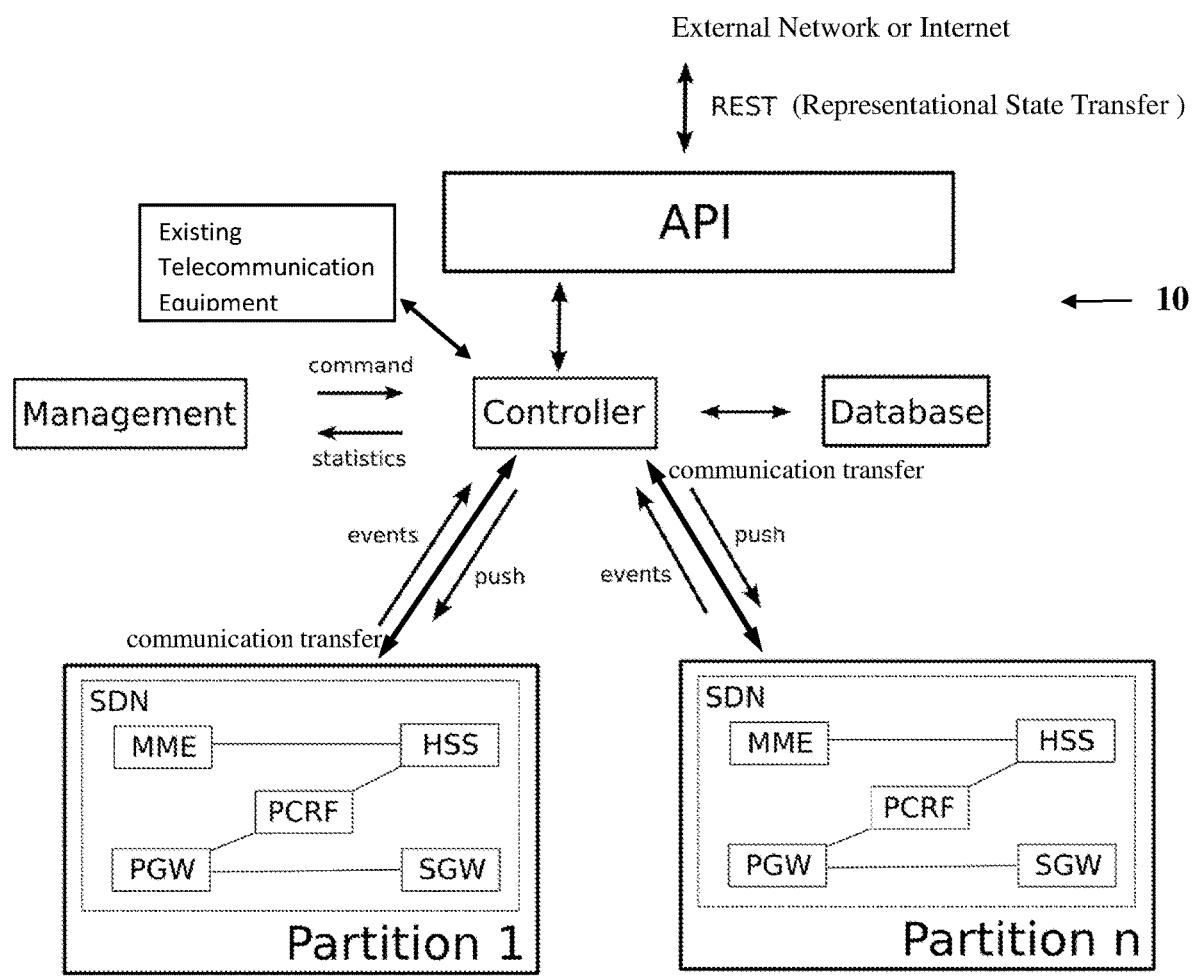

SYSTEM AND METHOD FOR PARTITIONED WIRELESS TELECOMMUNICATION NETWORK DEPLOYMENT

1. CROSS REFERENCE TO RELATED APPLICATIONS

This application is related and claims priority to U.S. Provisional Patent Application Ser. No. 62/239,904 filed Oct. 10, 2015 and entitled "System and Method for Partitioned Wireless Telecommunication Network Deployment", which is hereby incorporated herein by reference in its entirety for all purposes.

2. TECHNICAL FIELD

The present disclosure relates generally to wireless telecommunication networks and their deployment and operation. More specifically, the present disclosure relates to a system and method for partitioned deployment and operation of wireless telecommunication networks implemented using software defined networking (SDN).

3. BACKGROUND OF THE INVENTION

As digital wireless telecommunication networks have become widely used and the number of devices connecting to wireless networks and volume of data transmitted over such networks has expanded exponentially, the cost and complexity of deploying, operating and upgrading wireless telecommunication networks has also increased significantly. Accordingly, virtualization of certain network functions on wireless telecommunication networks has begun to be adopted in order to allow more flexibility of managing the hardware and software elements of wireless network systems, and to enable consolidation of many network equipment types onto industry standard high volume servers, switches and storage.

Typically, such virtualization of network functions involves implementing network functions in software (referred to broadly as software defined networking or SDN and more specifically as network function virtualization or NFV) that can run on a range of industry standard server hardware, and that can be moved to, or instantiated in, various locations in the network or provided by external virtualized equipment capacity providers as required, without the need to install new equipment. This technology could provide benefits for wireless telecommunication network operators and their customers such as reduced operator capital expenditures and operating expenditures through reduced equipment costs and reduced power consumption; quicker and less costly deployment of new network services; greater scalability and flexibility to rapidly adapt to changing capacity requirements, and reduced risks for deploying new network services. However, as wireless network functions are virtualized, the ability to perform commissioning, capacity planning (such as of scaling and/or performance), and management of such virtualized wireless network components grows increasingly complex.

Also, in some existing implementations, virtualization of wireless network technology is centered on conventional high availability (HA) solutions which are architected in a conventional active/passive fashion. This typically involves undesirable duplication of hardware and software elements in order to provide for a fault tolerant wireless networking solution, as particularly in conventional NFV systems such duplication is required on a 1+1 basis to add HA capacity.

Accordingly, in view of the above, a need exists for improved systems and methods to provide for distributed virtualization of wireless telecommunication network functionality that may desirably provide for improving efficiency, flexibility and cost effectiveness of deployment and operation of such wireless telecommunication networks.

4. SUMMARY OF THE INVENTION

It is an object of the present invention to provide a system and method for partitioned wireless telecommunication network deployment and operation that addresses some of the limitations of the prior art.

Another object of the present invention is to provide a system and method for intelligently partitioning a virtualized wireless telecommunication network that algorithmically identifies a desirably efficient partitioning scheme such as to desirably enhance at least one of performance and cost effectiveness of the wireless network that addresses some of the limitations of the prior art.

It is a further object of the invention to provide a system and method for intelligently partitioning a virtualized wireless telecommunication network that desirably provides for deployment of virtualized network functions using micro containers using software defined networking (SDN) techniques, such as NFV in particular.

Yet another object of the present invention is to provide a system and method for intelligently partitioning a virtualized wireless telecommunication network that desirably provides for identification of partitions and distribution of virtualized network functions on micro containers to desirably reduce propagation and impact of failure or errors in one or any of the partitions of the wireless network.

In one embodiment of the present invention, a non-transitory computer readable medium stores instructions, which, when executed by a computer, cause the computer to perform a method to provide for partitioning a virtualized wireless telecommunication network comprising deployment of virtualized network functions on micro containers using at least one of NFV and SDN to dynamically provide an entire wireless telecommunication core network system. In one such embodiment, the wireless core network system may comprise a Long Term Evolution (LTE) Evolved Packet Core (EPC) network system, for example.

In another embodiment of the present invention, a system for providing a partitioned wireless telecommunication network is provided comprising:

an application programming interface for providing connection of the partitioned wireless telecommunication network to an external data network;

a controller comprising non-transitory computer executable instructions to:

define a plurality of partitioned instances of the partitioned wireless telecommunication network;

map connections (such as but not limited to data, provisioning, partitioning, signaling and communication connections) to said plurality of partitioned instances of the partitioned wireless telecommunication network;

control starting, stopping, and pausing operation of said plurality of partitioned instances of the partitioned wireless telecommunication network;

wherein said controller is connected to a database storing at least one of wireless network traffic and wireless network user data for said partitioned wireless telecommunication network; and wherein each partitioned instance of said plurality of partitioned instances of said partitioned wireless telecommunication network comprises a plurality of micro containers, wherein each of said plurality of micro containers comprises non-transitory computer executable instructions to implement one or more wireless telecommunication network elements.

In a further embodiment of the present invention, a method for partitioning a wireless telecommunication network is provided, where the method comprises the steps of:
providing an application programming interface for connecting the partitioned wireless telecommunication network to an external data network;
defining a plurality of partitioned instances of the partitioned wireless telecommunication network;
mapping connections (such as but not limited to data, provisioning, partitioning, signaling and communication connections) to said plurality of partitioned instances of the partitioned wireless telecommunication network;
controlling starting, stopping, and pausing operation of said plurality of partitioned instances of the partitioned wireless telecommunication network;
storing at least wireless network traffic and wireless network user data for said partitioned wireless telecommunication network; and implementing each of said plurality of partitioned instances of said partitioned wireless telecommunication network by execution in a plurality of micro containers, wherein each of said plurality of micro containers comprises non-transitory computer executable instructions to implement one or more wireless telecommunication network elements.

Further advantages of the invention will become apparent when considering the drawings in conjunction with the detailed description.

5. BRIEF DESCRIPTION OF THE DRAWINGS

The system and method of the present invention will now be described with reference to the accompanying drawing FIGURES, in which:

FIG. 1 illustrates an exemplary partitioned wireless telecommunication network architecture for implementing a partitioned containerized LTE core network according to an embodiment of the present invention.

6. DETAILED DESCRIPTION OF THE INVENTION

FIG. 1 illustrates an exemplary schematic view of a partitioned virtualized wireless telecommunication network 10 in which embodiments of the present invention may be implemented. In one such embodiment, the wireless telecommunication network 10 may comprise an LTE core network which may be deployed on micro containers using SDN in order to dynamically create an entire virtualized 4G (fourth generation) LTE core network system comprising multiple partitions. In other embodiments, the virtualized wireless telecommunication network may comprise other telecommunication software and network types or components, such as IMS (IP Multimedia Subsystem), load balancers, eNodeB radio components, or other telecommunication network software, for example.

In a particular embodiment of the invention implementing an LTE wireless telecommunication network, Long Term Evolution (LTE) refers to a standard for wireless communication of high-speed data for mobile phones and data terminals. LTE networks are typically composed of a radio access network (RAN) portion and a wireless core packet network portion that is typically referred to as the Evolved Packet Core (EPC). The RAN portion of an LTE network typically includes evolved eNodeB radios which provide a wireless or air-to-air interface for access to the LTE network by wireless devices. The EPC of an LTE network typically includes wireless network elements such as Serving Gateways (SGWs), Packet Data Network or PDN Gateways (PGWs), Mobility Management Entities (MMEs), Policy and Charging Rules Functions (PCRFs), Home Subscriber Servers (HSS) and the like.

In one embodiment according to the present invention, an Application Programming Interface (API) may desirably be exposed, such as in a Graphical User Interface (GUI) or other user-centric interface to allow for connection of the partitioned wireless telecommunications network system 10 to an external network, such as the Internet, or other external network typically organized according to a Representational State Transfer (REST) architecture. In such an embodiment, the API may front the partitioned wireless network 10 so that users accessing the partitioned network 10 may desirably get one holistic view of the partitioned system 10 that can then be used for automation, management (including accounting, statistics and billing, for example) and provisioning of the wireless network, for example. In a particular embodiment, the partitioned wireless network 10 may comprise a programmatic interface that may desirably reduce the complexity of managing a conventional telecommunication network operated using existing protocols, and instead may desirably expose a programmatic provisioning interface for external and internal parties to interact with the partitioned wireless telecom network 10 where users do not need to consider how the underlying partitioning functions. In another embodiment, the API exposes provisioning, management, and automation aspects of the partitioned wireless network 10 that desirably provides for a single unified view over one or more partitions (such as partitions 1 . . . n) so an API user does not require knowledge of platform, partitioning and the management of the partitioned wireless network 10 platform. This may desirably allow the user to focus on desired practical high level functions, such as adding and removing wireless users, adding and removing wireless network policies or integrating telephony components to their existing enterprise software, for example. In a particular embodiment, the API may desirably expose an interface to outside third parties allowing for authorization, authentication, and accounting procedures with respect to the partitioned wireless network 10. In one such embodiment, the API may expose such an interface to third parties using REST architecture, to provide for third party management of a subset of the partitioned wireless system functions, for example.

In one embodiment, the partitioned wireless telecommunications network 10 may desirably comprise a Controller (as illustrated in FIG. 1) as the "engine" of the network, wherein the controller may preferably include core control processing procedures for the wireless network 10. In one such embodiment, the control processing procedures may comprise partitioning procedures such as algorithms for determining desired partitioning schemes for containerized deployment of SDN partitioned instances of the wireless network software, including machine learning and/or artificial intelligence (AI) algorithms or models for determining partitioning of the wireless network 10. In another such embodiment, the Controller processing procedures may also comprise mapping algorithms to establish and maintain mapping to wireless network entities or elements, and which network partitions they use. The Controller processing procedures may also comprise procedures for storing and managing data for the wireless network system 10, such as to store a full replica or all state of the wireless network 10, so that the system may be resurrected from such data storage to re-start or re-establish portions or the entire wireless network 10 from such stored data. In one such embodiment, the Controller may store and manage data in a connected Database (such as illustrated in FIG. 1) which may be provided by any suitable known standard database functionality. The Controller may also comprise command procedures, such as for managing all partitions (such as Partitions 1 . . . n) in the partitioned wireless network 10, such as starting, stopping, pausing partitions or other partition management procedures, for example. The Controller command procedures may also comprise pushing network changes to partitions, receiving events, alarms and statistics from partitions, and updating network data stored in the Database, such as to allow for restarting or resuming partitions, for example. In one particular embodiment, the Controller may also comprise a Management module, such as to provide for interface with the Controller to provide commands to the Controller for management of the partitions of the wireless network 10, or to receive statistics from partitions transmitted by the Controller, for example. In a further embodiment, the Controller and/or Management module may provide for automation of the provisioning, startup and decommissioning of any partition as to reduce the need for human interaction or manual oversight as it relates to systems management methodologies.

In another embodiment, the Controller may also optionally comprise a partition aware proxy module and may comprise command procedures for providing communication and control connections to existing telecommunication equipment, such as the RAN for an exemplary LTE telecommunication network, without exposing the partitioned structure of the partitioned wireless telecommunication network 10 architecture controlled by the Controller. In one such embodiment, the Controller may desirably comprise a partition aware proxy which may comprise command procedures for providing an opaque interface for communication and control connections to existing telecommunication equipment (as shown in FIG. 1), such that the Controller may provide for communication of existing telecommunication equipment with the partitioned wireless packet network 10, without exposing the partitioned architecture or the configuration or processes associated with the partitioned wireless network 10. Accordingly, in one such embodiment, existing telecommunication equipment, such as an exemplary existing LTE RAN, may communicate with the Controller as an opaque partition aware proxy, without exposing the partitioned architecture of the partitioned wireless network 10 to the existing telecommunication equipment, or requiring modification of the existing telecommunication equipment to function with the partitioned wireless network 10.

In one embodiment of the present invention, a system and method for partitioning a wireless telecommunication network implementing an LTE EPC comprises partitioning the virtualized LTE EPC functions onto micro containers using at least one of NFV and/or SDN to provide multiple EPC partitions (such as illustrated as Partition 1 and Partition n illustrated in FIG. 1). In one particular embodiment, the partitioned wireless network may be partitioned in a multiplicity of orthogonal dimensions. In one such embodiment, the wireless network functions may be partitioned into multiple instances of the LTE EPC (or other telecommunications software in other embodiments) software, each running in micro containers, such as to partition traffic and subscribers over the multiple instances. In one embodiment, the theoretical number of partitions is not limited, and can be expanded to provide virtually unlimited partitioned instances of the EPC networking software running in micro containers using NFV and/or SDN. In one such embodiment, such partitioning of the LTE EPC into multiple instances may be used to deploy such multiple instances of the wireless network software using on the same hardware. In another such embodiment, partitioning may be used to divide the traffic and subscribers on a wireless network over numerous sets of micro containers, which in some embodiments may desirably allow for fewer hardware machines being used to deploy the multiple partitioned by use of micro containers.

In an exemplary such embodiment, then users of the wireless network may be partitioned in any number of ways over micro containers. This may desirably allow for increased fault tolerance of a larger deployment environment of the wireless network, such as due to the fact that only a small portion of the deployment may be affected by any particular system errors or faults which may be desirably limited to only one or a subset of the partitioned instances of the wireless networking software. Such partitioning may also desirably allow for avoiding restriction of an entire wireless telecommunications network deployment environment by a traditional active/passive high availability (HA) model. In one such embodiment, when a system error is detected, an affected partition(s) may be simply killed or terminated, and such partition(s) may be re-started somewhere else within the network deployment environment, thereby desirably limiting any effect on the greater network populace or system.

In one aspect of the present invention, high availability (HA) may be managed by moving, stopping, re-starting or modifying individual or multiple containers upon error detection. Accordingly, in such an aspect, the partitioned wireless network 10 may desirably ensure that any one single failure within a single partition, affects only a very small number of subscribers and traffic managed by that partition, as opposed to affecting the entire overall deployment group. In contrast to some conventional wireless networks in which a monolithic subscriber base may be supported using only one wireless network partition, in one embodiment of the present invention a partitioned wireless network 10 may be provided where many (in some embodiments thousands) partitions are used to divide traffic and subscribers across large numbers of partitions, and to reduce the chance for a fault occurring in one partition from affecting traffic or users in any of the other partitions, for example.

In one embodiment of the present invention, partitioning algorithms may be used to mathematically calculate the most effective partitioning scheme for a particular wireless network deployment such as by using machine learning (ML) or artificial intelligence (AI) to identify the most efficient partitions, preferably both from a resource (performance) and cost (dollar) point of view. In one such embodiment, the inherent artificial intelligence (AI) implemented in the partitioning algorithms of the Controller of the partitioned wireless network 10, may also be used to desirably minimize the effects of one single failure within a partition. In another such embodiment, machine learning may be implemented to identify the partitions and the distribution of micro containers on which the partitions are deployed, to make sure any one error, system failure or fault has the least impact possible to the overall wireless network 10.

Accordingly, in one embodiment, providing multiple partitions of the wireless network 10 deployed on micro containers using NFV and/or SDN may desirably provide additional benefits, such as:

reducing cost for instantiating a new instance (desirably to near zero);

allowing for automation, startup and provisioning—such as by initiating startup of a new partition of specific telecom software;

providing for automated end-to-end service deployment to such a degree the solution may desirably be rapidly deployed (in one embodiment preferably deployed in seconds);

reducing the performance 'tax' incurred by deploying traditional HA models (cost, overhead and performance);

providing an alternate way of dealing with errors in a minimally invasive way in order to mitigate large-scale downtime/system faults that interrupt traffic and result in data packet loss, such as by simply instantiating a new container rather than large scale HA deployment—which in one embodiment may desirably reduce costs and simplify HA.

In a further embodiment of the present invention, the partitioned wireless network 10 may comprise a combination of a containerized LTE core deployed in a multiple partition fashion. Although in one embodiment (such as illustrated in FIG. 1) the use of an LTE network architecture is contemplated, in other embodiments there are numerous telecom software environments that can be deployed in a substantially similar partitioned manner, such as IP Multimedia Subsystems (IMS), load balancers, eNodeB radio components, or other telecommunication network software, for example. Accordingly, in alternative embodiments a broad number of telecommunication 'networks', beyond LTE networks in particular, may be containerized and deployed in multiple partitions according to the systems and methods of the present invention.

In one embodiment, the systems and methods of providing a partitioned wireless network deployed onto micro containers described herein comprise a new and novel way to deploy telecom software in a telecommunications network to desirably provide for reducing at least one of: hardware, software, and administration (management) cost. In one such embodiment, the aforementioned costs may desirably be reduced by deploying telecom software in a containerized environment on a smaller subset of machines. In a further aspect, wireless telecommunication networks according to embodiments of the invention may not run HA on a per machine basis, and instead may provide an overall solution which is willing to accept more errors than a traditional HA architecture allows, so as to simplify the management, infrastructure, deployment footprint and amount of knowledge administrators need to de-bug or otherwise operate wireless telecommunication network systems.

In another embodiment, change management may desirably be implemented within a partitioned wireless network 10, such that changes are not propagated across all partitions in one fell swoop, but rather change management is accomplished through machine learning or AI for configuration changes, such that only 1 partition may initially receive updates. Then, desirably through metrics and AI, the change may be rolled out to more subscribers (across more partitions) whereby the system desirably provides for tighter control over errors, be they in patching, configuration or other changes. In one such embodiment, a gradual propagation of changes across the partitioned wireless network 10 may desirably provide for a maximum amount of changes at the minimum amount of cost. Moreover, where traditional monolithic telecom systems may typically require planning of patch management or change management processes to occur over a time window measured in months, in one embodiment, changes may be propagated across a partitioned wireless network 10 according to the above described procedures, to increases the speed or frequency of the change management process to allow for nightly or overnight change management rollout, if that is a requirement.

It will be appreciated that the functions depicted and described herein may be implemented in software such as by NFV and/or SDN, or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the methods discussed herein may be implemented within software, or a combination of software and hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., use of "or else" or "or in the alternative").

An embodiment of the present invention relates to a computer storage product with a non-transitory computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: programmable logic devices ("PLDs") and ROM and RAM devices including Flash RAM memory storage cards, sticks and chips, for example magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), for example. Examples of computer code include machine code, such as produced by a compiler, and files containing higher-level code that are executed by a computer using an interpreter. For example, an embodiment of the invention may be implemented using HTML5, XML, JavaScript, Java, C#, C++, Objective C, or any other suitable known scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the claims.

What is claimed is:

1. A system for providing a partitioned wireless telecommunication network comprising:
    an application programming interface for providing connection of the partitioned wireless telecommunication network to an external data network; and
    a controller comprising non-transitory computer executable instructions to:
        define a plurality of partitioned instances of the partitioned wireless telecommunication network;
        map connections to said plurality of partitioned instances of the partitioned wireless telecommunication network;
        control starting, stopping, and pausing operation of said plurality of partitioned instances of the partitioned wireless telecommunication network;
    wherein said controller is connected to a database storing at least one of wireless network traffic and wireless network user data for said partitioned wireless telecommunication network, and further comprises a partition aware proxy for providing an opaque interface for communication and control connections to existing telecommunication equipment, wherein the existing telecommunication equipment comprises an existing long term evolution (LTE) telecommunication network that communicates with the controller via the opaque interface, and wherein the partition aware proxy provides communication with the existing telecommunications equipment without exposing partitioned structure or configuration of the plurality of partitioned instances of the partitioned wireless telecommunication network;
    wherein each partitioned instance of said plurality of partitioned instances of said partitioned wireless telecommunication network comprises a plurality of micro containers, wherein each of said plurality of micro containers comprises non-transitory computer executable instructions to implement one or more wireless telecommunication network elements; and
    wherein each partitioned instance implements a plurality of LTE evolved packet core (EPC) wireless telecommunication network elements comprising: a packet data network gateway (PGW), and a home subscriber server (HSS).

2. The system according to claim 1, wherein said application programming interface comprises a graphical user interface.

3. The system according to claim 1, wherein said graphical user interface comprises non-transitory computer executable instructions to allow a user to configure said plurality of partitioned instances of the partitioned wireless telecommunication network.

4. The system according to claim 1, wherein the EPC of each partitioned instance further comprises one or more of: a serving gateway (SGW), a mobility management entity (MME), or a policy and charging rules function (PCRF).

5. The system according to claim 1, wherein each of said plurality of partitioned instances of the partitioned wireless telecommunication network is implemented as a software defined networking partitioned instance.

6. The system according to claim 1, wherein said controller additionally comprises non-transitory computer executable instructions to:
    store a replica of at least a portion of the plurality of partitioned instances of the partitioned wireless telecommunication network in said database: and
    recover at least the portion of the plurality of partitioned instances of the partitioned wireless telecommunication network from said database.

7. The system according to claim 1, wherein each of said plurality of micro containers is implemented as a virtualized network function element.

8. The system according to claim 1, wherein said non-transitory computer executable instructions to define the plurality of partitioned instances of the partitioned wireless telecommunication network comprise at least one of:
    instructions to divide wireless network traffic distribution across the plurality of partitioned instances;
    instructions to divide wireless network user across the plurality of partitioned instances;
    instructions to reduce hardware resources required for operating the plurality of partitioned instances; and
    instructions to increase redundancy of said wireless telecommunication network elements.

9. The system according to claim 1, wherein the existing LTE telecommunication network comprises an existing LTE radio access network (RAN).

10. The system according to claim 9, wherein the partition aware proxy provides the opaque interface for communication between the existing LTE RAN and the EPC wireless telecommunication network elements of each of the partitioned instances.

11. A method for partitioning a wireless telecommunication network, comprising:
    providing an application programming interface for connecting the partitioned wireless telecommunication network to an external data network;
    defining a plurality of partitioned instances of the partitioned wireless telecommunication network;
    mapping connections to said plurality of partitioned instances of the partitioned wireless telecommunication network;
    controlling starting, stopping, and pausing operation of said plurality of partitioned instances of the partitioned wireless telecommunication network;
    storing at least one of wireless network traffic and wireless network user data for said partitioned wireless telecommunication network;
    providing an opaque interface for communication and control connections to existing telecommunication equipment without exposing partitioned structure or configuration of the plurality of partitioned instances of the partitioned wireless telecommunication network, wherein the existing telecommunication equipment comprises an existing long term evolution (LTE) telecommunication network that communicates with the plurality of partitioned instances via the opaque interface; and
    implementing each of said plurality of partitioned instances of said partitioned wireless telecommunication network by execution in a plurality of micro containers, wherein each of said plurality of micro containers comprises non-transitory computer executable instructions to implement one or more wireless telecommunication network elements;

wherein each partitioned instance implements a plurality of LTE evolved packet core (EPC) wireless telecommunication network elements comprising: a packet data network gateway (PGW), and a home subscriber server (HSS).

12. The method according to claim 11, wherein said application programming interface comprises a graphical user interface.

13. The method according to claim 11, wherein said graphical user interface comprises non-transitory computer executable instructions to allow a user to configure said plurality of partitioned instances of the partitioned wireless telecommunication network.

14. The method according to claim 11, wherein the EPC of each partitioned instance further comprises one or more of: a serving gateway (SGW), a mobility management entity (MME), or a policy and charging rules function (PCRF).

15. The method according to claim 11, wherein implementing each of said plurality of partitioned instances of said partitioned wireless telecommunication network by execution in said plurality of micro containers comprises implementing each of said plurality of partitioned instances as a software defined networking partitioned instance.

16. The method according to claim 11, wherein said controlling additionally comprises controlling at least one of provisioning, initialization and decommissioning of at least one partitioned instance of said plurality of partitioned instances of said partitioned wireless telecommunication network.

17. The method according to claim 11, additionally comprising:
    storing a replica of at least a portion of said plurality of partitioned instances of the partitioned wireless telecommunication network in a database; and
    recovering at least a portion of said plurality of partitioned instances of the partitioned wireless telecommunication network from said database.

18. The method according to claim 11, wherein implementing each of said plurality of partitioned instances of said partitioned wireless telecommunication network by execution in said plurality of micro containers comprises implementing each of said plurality of micro containers as a virtualized network function element.

19. The method according to claim 11, wherein defining a plurality of partitioned instances of the partitioned wireless telecommunication network comprises at least one of:
    dividing wireless network traffic distribution across said plurality of partitioned instances;
    dividing wireless network user across said plurality of partitioned instances;
    dividing said partitioned instances across a minimum number of hardware resources; and
    defining redundancy of at least a portion of said wireless telecommunication network elements across said partitioned instances.

20. One or more non-transitory computer-readable media storing computer-executable instructions for execution on one or more computing devices to perform operations for partitioning a wireless telecommunication network, the operations comprising:
    providing an application programming interface for connecting the partitioned wireless telecommunication network to an external data network;
    defining a plurality of partitioned instances of the partitioned wireless telecommunication network;
    mapping connections to said plurality of partitioned instances of the partitioned wireless telecommunication network;
    controlling starting, stopping, and pausing operation of said plurality of partitioned instances of the partitioned wireless telecommunication network;
    storing at least one of wireless network traffic and wireless network user data for said partitioned wireless telecommunication network;
    providing an opaque interface for communication and control connections to existing telecommunication equipment without exposing partitioned structure or configuration of the plurality of partitioned instances of the partitioned wireless telecommunication network, wherein the existing telecommunication equipment comprises an existing long term evolution (LTE) telecommunication network that communicates with the plurality of partitioned instances via the opaque interface; and
    implementing each of said plurality of partitioned instances of said partitioned wireless telecommunication network by execution in a plurality of micro containers, wherein each of said plurality of micro containers comprises non-transitory computer executable instructions to implement one or more wireless telecommunication network elements;
    wherein each partitioned instance implements a plurality of LTE evolved packet core (EPC) wireless telecommunication network elements comprising: a packet data network gateway (PGW), and a home subscriber server (HSS).

* * * * *